(No Model.) 3 Sheets—Sheet 1.
D. C. SHEPHERD & L. C. BALLARD.
APPARATUS FOR LOADING VESSELS.
No. 475,814. Patented May 31, 1892.
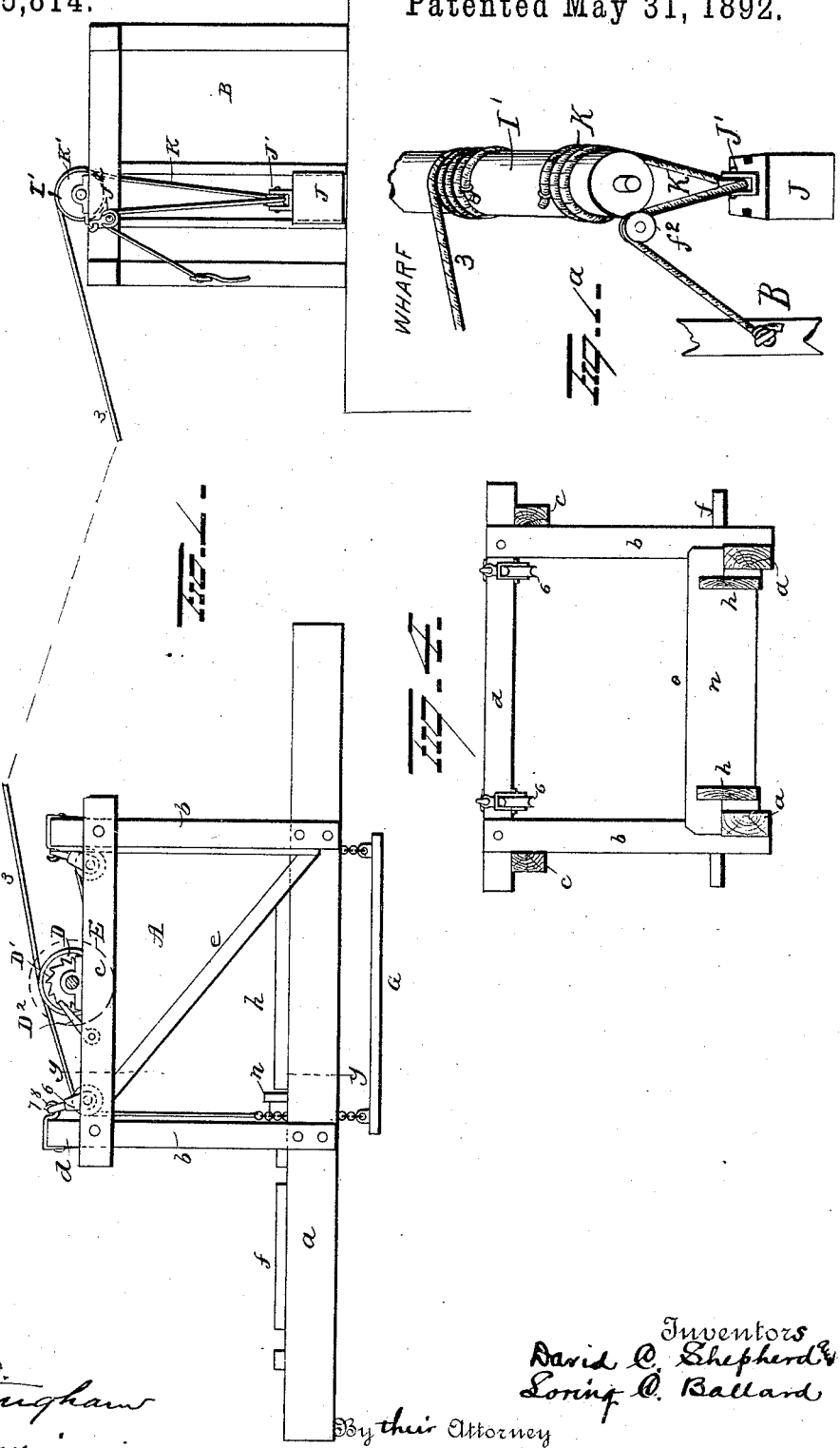

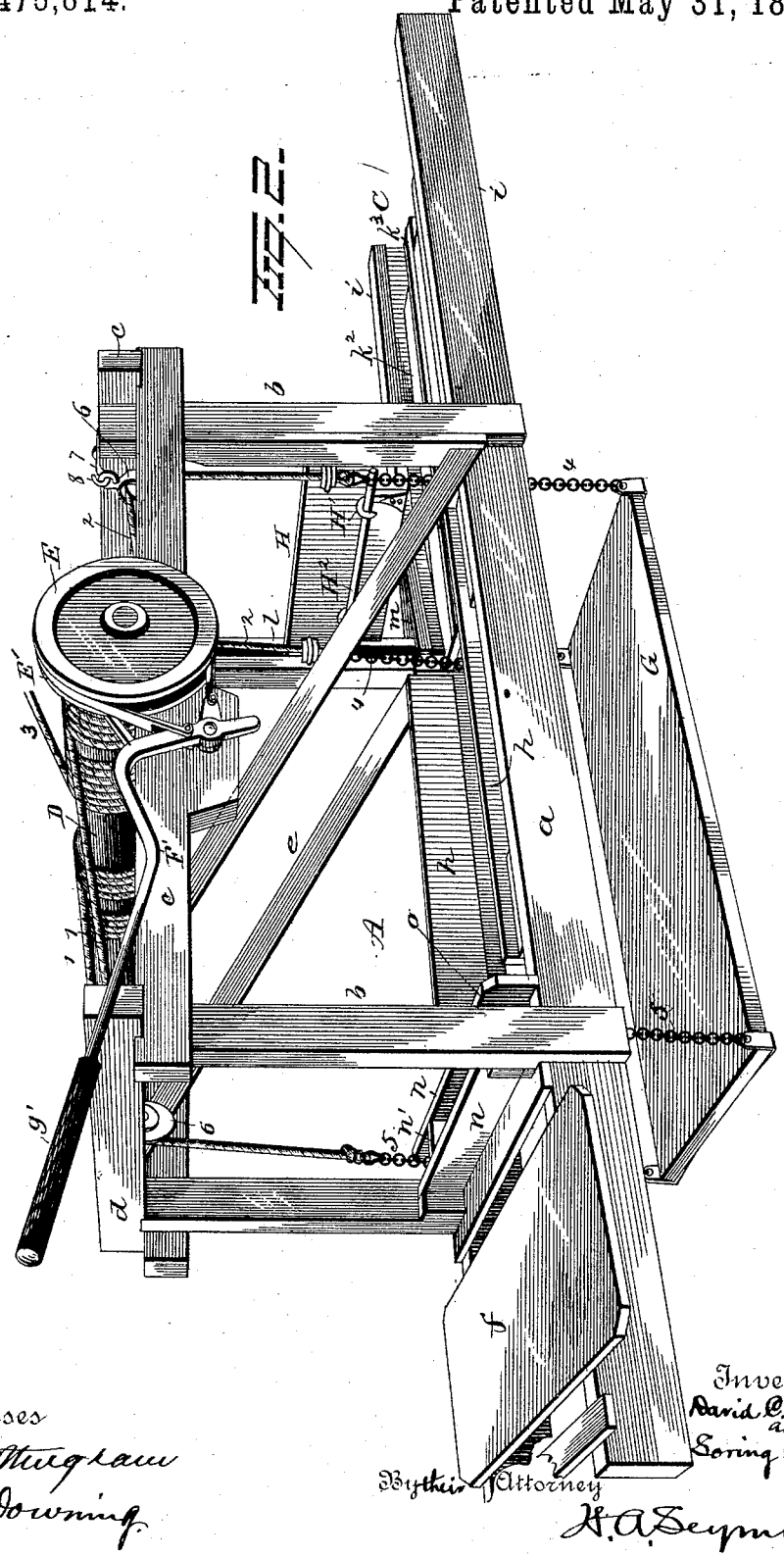

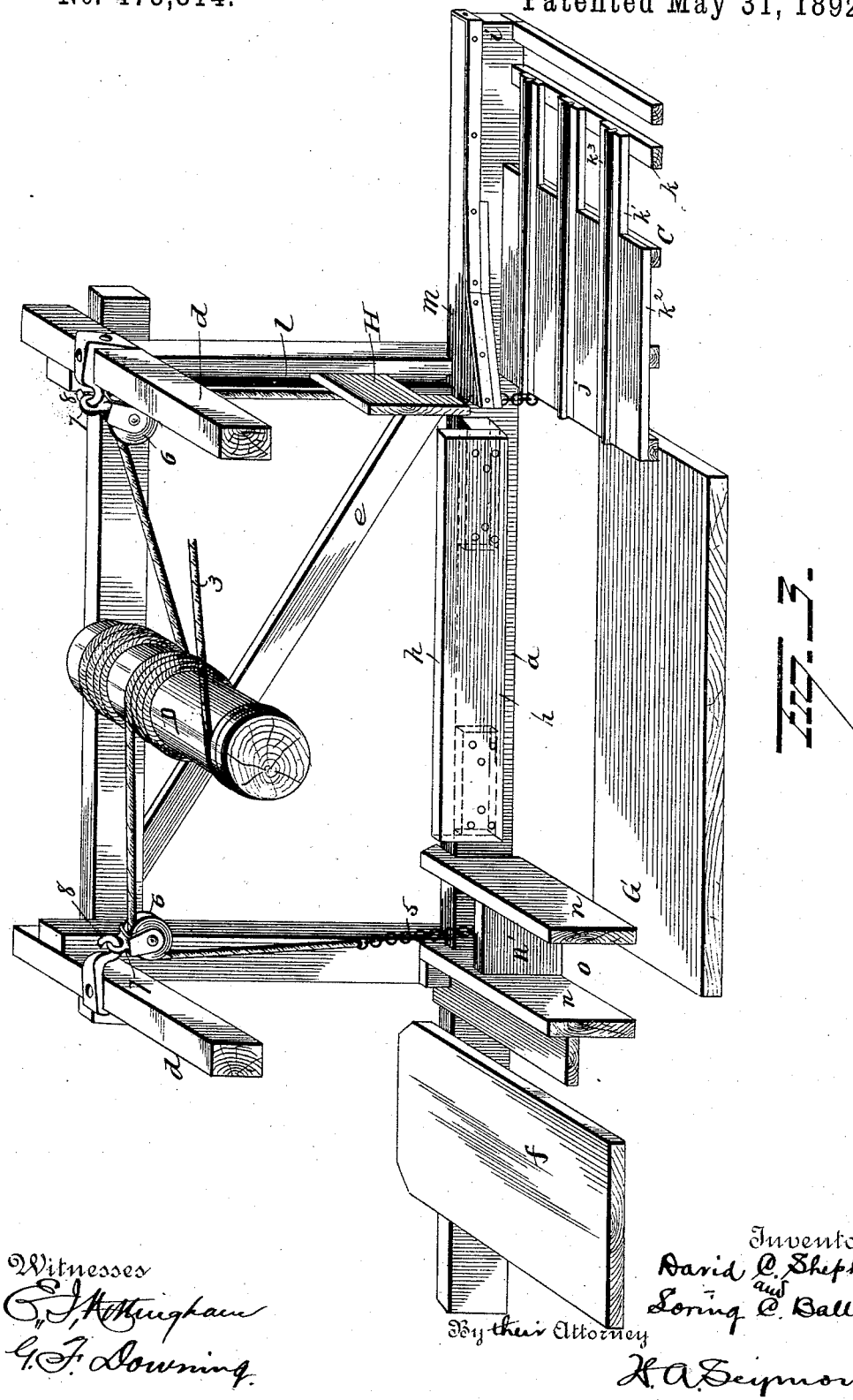

UNITED STATES PATENT OFFICE.

DAVID C. SHEPHERD AND LORING C. BALLARD, OF GARDINER, MAINE.

APPARATUS FOR LOADING VESSELS.

SPECIFICATION forming part of Letters Patent No. 475,814, dated May 31, 1892.

Application filed August 30, 1890. Serial No. 363,516. (No model.)

*To all whom it may concern:*

Be it known that we, DAVID C. SHEPHERD and LORING C. BALLARD, of Gardiner, in the county of Kennebec and State of Maine, have invented certain new and useful Improvements in Raising and Lowering Apparatus; and we do hereby declare the following to be a full, clear, and exact description of the invention, such as will enable others skilled in the art to which it appertains to make and use the same.

Our invention relates to an improvement in raising and lowering machines, and more particularly to machines for loading ice and other merchandise in the hold of vessels.

The object of the invention is to produce an apparatus, by means of which ice, &c., may be easily and quickly lowered into the hold of a vessel with the expenditure of a very small amount of labor on the part of the attendant.

A further object is to provide a raising and lowering machine with an improved arrangement of lowering - ropes, counterbalance-weight, and rope.

With these objects in view the invention consists in certain novel features of construction and combinations and arrangements of parts, as hereinafter set forth, and pointed out in the claims.

In the accompanying drawings, Figure 1 is a side elevation of the machine. Fig. 1$^a$ is a view in perspective of the devices employed for elevating the platform. Fig. 2 is a perspective view of the raising and lowering apparatus. Fig. 3 is a longitudinal sectional view. Fig. 4 is a view on the line $y\ y$ of Fig. 1.

A represents the lowering apparatus proper; B, the frame, which carries the counter-weight for returning the lowering platform, as hereinafter explained, and C the chute or way for connecting the lowering apparatus A and the frame B.

The frame of the lowering apparatus comprises two lower longitudinal timbers $a$, four uprights $b$, upper longitudinal timbers $c$, cross-bars $d$, and suitable bracing-timbers $e$, the lower longitudinal timbers $a$ being extended rearwardly beyond the uprights $b$ and provided with a platform $f$ for the accommodation of an attendant.

Mounted in suitable journal-boxes located centrally on the upper longitudinal timbers $c$ is a roller or drum D, having a ratchet-wheel D' at one end thereof, with which a dog D$^2$ on the frame is adapted to engage to prevent the drum from unwinding at an improper time.

On one end of the shaft of the drum D is a friction-wheel E, over which a band E' is passed, one end of said band being secured to a pin or projection on the frame or upper longitudinal timber $c$ and the other end to a lever F, which latter is pivotally connected to the frame-work and provided with a rearwardly - extending handle $g'$, by means of which to manipulate the brake thus formed.

Wound upon the roller or drum D is a series of ropes 1 1, 2 2, 3, the ropes 1 1 being wound upon the drum in one direction and the ropes 2 2 being wound thereon in the reverse direction, so that when the drum is rotated all the ropes will be unwound in unison, the rope 3 being connected with a weight, as presently explained. The ropes 1 1 and 2 2 pass through sheave-blocks 6. The blocks 6 are made of iron with steel pins, having a swivel and eye 7 to hook into an iron hook 8 on cross-bars $d$. To prevent the ropes from riding on the drum D, these blocks must be light, and the swivel allows them to swing in winding and unwinding in a line with the ropes on the drum when turning quickly, and the ropes will be made to coil on the drum just right to prevent wear.

To the free ends of the ropes 1 1 and 2 2 are chains 4 4 and 5 5, which in turn are connected with the corners of a platform G, on which the materials to be lowered or raised are placed. This platform G is limited in its upward movement by means of guides $h$, secured to the lower longitudinal timbers $a\ a$, so that when the platform G is in its normal position it will align with the floor of the chute or way C. This chute or way C is composed of two longitudinal timbers $i\ i$, which are placed in an inclined position, and a floor $j$, which latter consists of a series of cross-bars $k$, on which a series of longitudinal bars $k'$ are located, and intermediate filling-boards $k^2$. Secured in the longitudinal bars $k'$ are rods $k^3$, having convex upper surfaces on which the ice or other material will freely slide. The uprights $b$ of the main frame at the point where the chute or way C connects with said frame are provided on their inner sides with guides $l$, adapted to produce ways for the ends of a sliding gate H, having hooks H', secured to its rear face. A rod $H^2$ connects the chains 4 4 and is adapted, when the platform G is raised to its normal position, to engage the hooks H' and raise the gate H. It will also be seen from this construction that when the platform G is lowered the rod $H^2$ will move downwardly with the chains 4 4, and thus automatically close the gate G and shut off the supply of ice or other material from the platform. When ice or other material is placed on the forward end of the chute or way C, which is on the wharf, it will slide down the chute and onto the platform G, being guided from the chute to the platform by means of inwardly-projecting guides $m$ on the longitudinal timbers $i$ $i$. The ice or other material will be prevented from moving too far on the platform G by means of a bunter $o$, secured to the main frame of the machine. This bunter is preferably made of oak, and is composed of two parallel bars $n$ $n$ and connecting-pieces $n'$.

Located on the wharf at a point near the forward end of the chute C is the frame or stand B on which is a roller I', and on this roller the free end of the rope 3 is wound. At one end of the roller I' two guides project downwardly from the cross-bar of frame B, and are adapted to receive between them and form guides for a counterweight-box J.

Journaled in suitable brackets in the top of the weight-box J is a pulley J' for the accommodation of a rope K, one end of which rope is secured to and adapted to be coiled upon the roller I', while the other end, after passing over a pulley $J^2$ on the frame, is secured to said frame B. From this construction it will be seen that when the platform G is loaded with ice or other material and allowed to lower (being regulated by the above-described friction-brake) the rope 3 will wind upon the drum D and unwind from the roller I'. At the same time the rope K will wind upon the roller I' and thus raise the weight-box J. When the platform shall have been lowered to the proper point and its load removed therefrom, the weight-box J will begin to move downwardly, and thus rotate the roller I', thus coiling the rope 3 upon said roller and rotating the drum D to wind the ropes 1 1 and 2 2 thereon, and thus raise the platform G.

The machine thus constructed is very simple and durable, is easy to manipulate and effective in operation.

Slight changes might be made in the details of construction of our invention without departing from the spirit thereof or limiting its scope. Hence we do not wish to restrict ourselves to the precise details of construction herein set forth; but,

Having thus described our invention, what we claim as new, and desire to secure by Letters Patent, is—

1. The combination, with a frame, a drum mounted thereon at the top thereof, and pulleys, one located at or near each corner of the frame, of a rope for each pulley, the several ropes being attached to the drum, so as to wind thereon simultaneously, a platform connected to the free ends of said ropes, means connected to said drum for turning same to wind all the ropes thereon, a chute, and a gate located between the chute and platform, the said gate adapted to be automatically actuated to close the end of the chute when the platform is lowered, substantially as set forth.

2. The combination, with a frame, of a drum journaled thereon, ropes wound around said drum, a platform supported by said ropes, a bunter carried by said frame, a chute, and a vertically-moving gate supported at its ends in guides and automatically actuated by the platform-supporting ropes for regulating the feed of material from the chute to the platform, substantially as set forth.

3. The combination, with a frame, pulleys located at or near the four corners thereof, and a drum mounted on said frame, of ropes secured to the drum, each rope passing over a pulley, a platform secured to the free ends of the ropes, a vertically-movable gate having devices adapted to be engaged by a device carried by two of the platform-supporting ropes, whereby the gate is elevated and lowered, a frame carrying a roller, a rope wound on said roller and drum and so arranged that when it unwinds from the drum it turns the latter in a direction to wind the platform-supporting ropes thereon, and a weighted rope wound around said roller, substantially as set forth.

In testimony whereof we have signed this specification in the presence of two subscribing witnesses.

DAVID C. SHEPHERD.
LORING C. BALLARD.

Witnesses:
JAMES J. WARD,
WARREN W. SEAVEY.